US011068402B2

(12) United States Patent
Garvey et al.

(10) Patent No.: US 11,068,402 B2
(45) Date of Patent: Jul. 20, 2021

(54) EXTERNALIZED CONFIGURATIONS AND CACHING SOLUTION

(71) Applicant: ADP, LLC, Roseland, NJ (US)

(72) Inventors: Stephen Dale Garvey, Alpharetta, GA (US); Gregory Fincannon, Alpharetta, GA (US)

(73) Assignee: ADP, LLC, Roseland, NJ (US)

( * ) Notice: Subject to any disclaimer, the term of this patent is extended or adjusted under 35 U.S.C. 154(b) by 23 days.

(21) Appl. No.: 16/412,817

(22) Filed: May 15, 2019

(65) Prior Publication Data

US 2020/0364143 A1    Nov. 19, 2020

(51) Int. Cl.
| G06F 8/71 | (2018.01) |
| G06F 12/084 | (2016.01) |
| G06F 12/0811 | (2016.01) |
| G06F 9/445 | (2018.01) |
| G06Q 10/10 | (2012.01) |

(52) U.S. Cl.
CPC ........ *G06F 12/084* (2013.01); *G06F 9/44505* (2013.01); *G06F 9/44536* (2013.01); *G06F 12/0811* (2013.01); *G06Q 10/105* (2013.01); *G06F 2212/1032* (2013.01)

(58) Field of Classification Search
CPC .............. G06F 12/084; G06F 9/44505; G06F 9/44536; G06F 2212/1032; G06F 12/0811; G06Q 10/105
See application file for complete search history.

(56) References Cited

U.S. PATENT DOCUMENTS

| 6,687,793 B1 * | 2/2004 | Thomas | G06F 12/0866 711/133 |
| 10,402,373 B1 * | 9/2019 | VanderKnyff | G06F 16/957 |
| 2008/0127162 A1 * | 5/2008 | Xu | G06F 9/44505 717/168 |
| 2011/0087754 A1 * | 4/2011 | Cansino | H04N 21/4627 709/217 |
| 2011/0119449 A1 * | 5/2011 | Neerincx | G06F 12/1458 711/133 |
| 2015/0121009 A1 * | 4/2015 | Smith | G06F 12/0811 711/122 |
| 2016/0299936 A1 * | 10/2016 | Chavda | H04L 67/02 |
| 2018/0007099 A1 * | 1/2018 | Ein-Gil | G06F 9/468 |
| 2019/0260388 A1 * | 8/2019 | Wegener | H03M 7/42 |

* cited by examiner

*Primary Examiner* — Chat C Do
*Assistant Examiner* — Noor Alkhateeb
(74) *Attorney, Agent, or Firm* — Patrick J. Daugherty; Daugherty & Del Zoppo Co. LPA

(57) ABSTRACT

Aspects store configuration version data for an application into a shared cache in a structured data format; in response to a request at run-time for the configuration version data, determine whether run-time format data of the configuration version data is stored in a different, local cache; and in response to determining that the run-time format configuration version data is not stored in the local cache, during execution of the application, read the structured data format data from the shared cache, translate the read data into the run-time data format, store the translated data into the local cache in the run-time format file and return the configuration version run-time format data stored within the local cache in satisfaction of the request at run-time for the configuration version data of the application.

15 Claims, 2 Drawing Sheets

EXTERNALIZED CONFIGURATIONS AND CACHING SOLUTION

BACKGROUND

Human resource management (sometimes "HRM" or "HR") generally refers to functions and systems deployed in organizations that are designed to facilitate or improve employee, member or participant performance in service of strategic objectives. HR comprehends how people are identified, categorized and managed within organizations via a variety of policies and systems. Human Resource management systems may span different organization departments and units with distinguished activity responsibilities.

Organizations may implement multiple versions of an HR system that have different configurations and user-specific permissions. Human Resource Information Systems (HRIS) comprehend information technology (IT) systems and processes configured and utilized in the service of HR, and HR data processing systems which integrate and manage information from a variety of different applications and databases.

SUMMARY

In one aspect of the present invention, a method includes a processor storing into a shared cache a structured data format file including configuration version data for an application; in response to a request at run-time for the configuration version data for the application, determining whether run-time format data of the configuration version data is stored in a local cache that is different from the shared cache, wherein the run-time format is different from the structured data format and enables a processor to execute the configuration version data at run-time; and in response to determining that the run-time format data of the configuration version data is not stored in the local cache, during execution of the application, reading data from the structured data format file stored in the shared cache, translating the read data from the structured data format into the run-time data format, storing the translated data into the local cache in a run-time format file, and returning data from the configuration version run-time format file stored within the local cache in satisfaction of the request at run-time for the configuration version data of the application.

In another aspect, a system has a hardware processor in circuit communication with a computer readable memory and a computer-readable storage medium having program instructions stored thereon. The processor executes the program instructions stored on the computer-readable storage medium via the computer readable memory and thereby stores into a shared cache a structured data format file including configuration version data for an application; in response to a request at run-time for the configuration version data for the application, determines whether run-time format data of the configuration version data is stored in a local cache that is different from the shared cache, wherein the run-time format is different from the structured data format and enables a processor to execute the configuration version data at run-time; and in response to determining that the run-time format data of the configuration version data is not stored in the local cache, during execution of the application, reads data from the structured data format file stored in the shared cache, translates the read data from the structured data format into the run-time data format, stores the translated data into the local cache in a run-time format file, and returns data from the configuration version run-time format file stored within the local cache in satisfaction of the request at run-time for the configuration version data of the application.

In another aspect, a computer program product has a computer-readable storage medium with computer readable program code embodied therewith. The computer readable program code includes instructions for execution which cause the processor to store into a shared cache a structured data format file including configuration version data for an application; in response to a request at run-time for the configuration version data for the application, determine whether run-time format data of the configuration version data is stored in a local cache that is different from the shared cache, wherein the run-time format is different from the structured data format and enables a processor to execute the configuration version data at run-time; and in response to determining that the run-time format data of the configuration version data is not stored in the local cache, during execution of the application, read data from the structured data format file stored in the shared cache, translate the read data from the structured data format into the run-time data format, store the translated data into the local cache in a run-time format file, and return data from the configuration version run-time format file stored within the local cache in satisfaction of the request at run-time for the configuration version data of the application.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

DETAILED DESCRIPTION

An HR application might have (be partitioned into) many containers, which are standard units or images of executable packages of computer-readable code and associated dependencies that are defined to enable the application to run quickly and reliably on different computing environments. Some containers may require different updates at different times relative to the others. Service providers may also desire to restrict some updates to only some members (users) of the organization, to selectively pilot or beta-test a change so that only some consumers use new, changed, or test versions of the configurations, while others continue to use a current default version.

Problems arise within conventional HR system management in dynamically changing application configurations at run-time in an efficient manner. For example, in order to effect configuration version changes to enable any one of the application containers conventional systems generally require a code deployment that spans all of the application containers. This approach is inefficient, incurring unnecessary testing, downtime, and processing costs in the redeployment to all containers for just a configuration change when no application logic is changing.

Aspects of the present invention provide methods, systems, processes and computer-readable storage medium solutions for allowing multiple versions of application con-
} figurations to be externalized and managed. Embodiments use Application Programming Interface (API) calls and multiple (shared and local) caching structures for isolation and improved performance relative to conventional solutions, versioning attributes to enable container and application configurations to be quickly changed without a code deployment.

Figure 1:
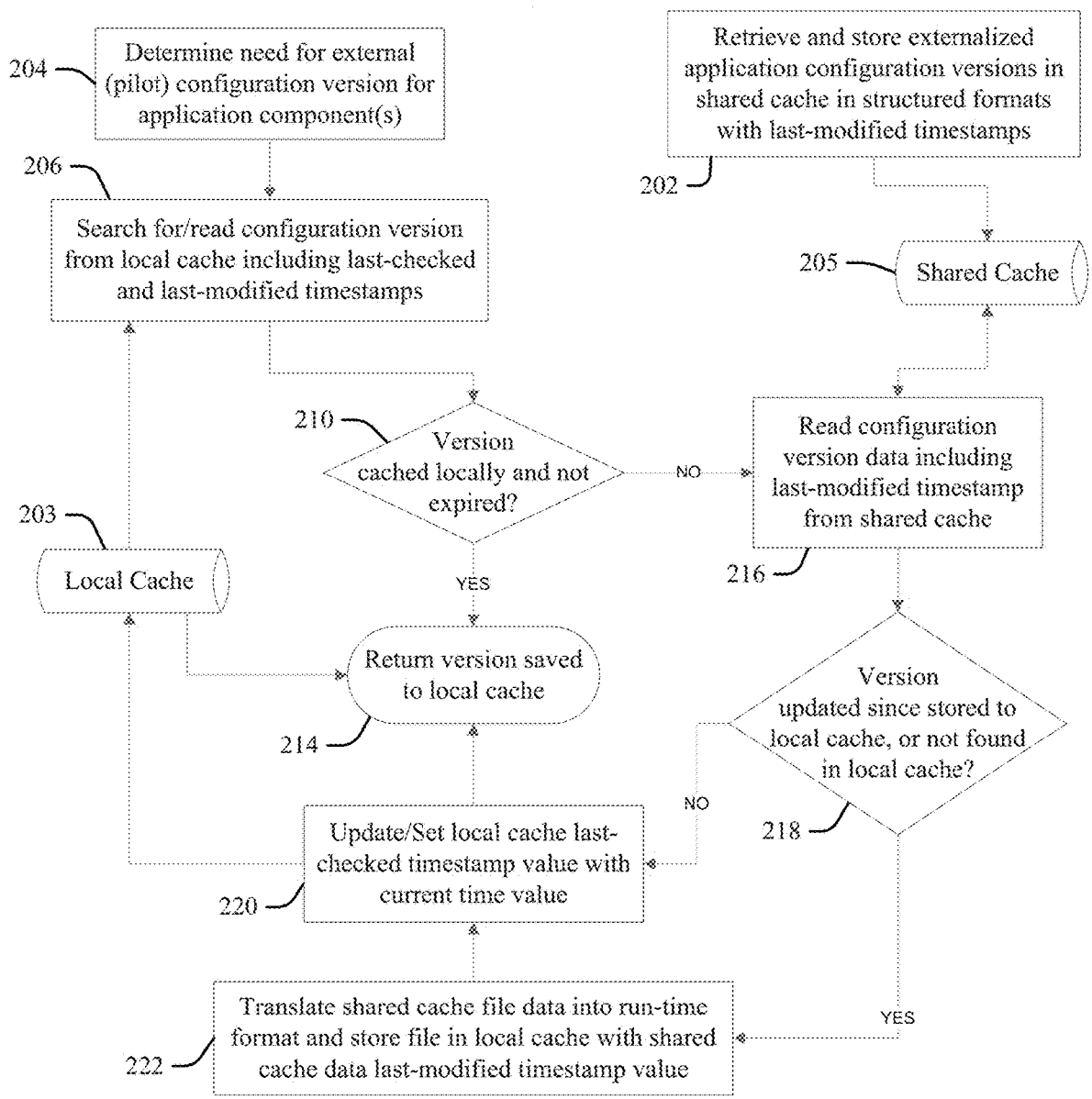
FIG. 1 is a flow chart illustration of a method or process aspect according to an embodiment of the present invention.

FIG. 1 illustrates an embodiment according to the present invention. At 202 a processor configured according to the present invention (the "configured processor") retrieves and stores one or more externalized configuration versions of an application that are used by various, different components (containers) of the application in a shared cache 205 in a structured format (for example, JSON (JavaScript® Object Notation), XML (extensible mark-up language), etc.), each with (associated to) a last-modified timestamp value that is used to check for changes (as discussed below), generally by using a cache key that includes the version identifier, and wherein the cached structured data is accessible by all of the application components that use the respective configuration versions.

Examples of REST (Representational State Transfer) API calls used by aspects of the present invention at 202 include a "Configurations PUT" API call that retrieves and stores configuration versions in structured formats. Some embodiments may use the Configurations PUT API code to further validate the configuration version data or storage information, or to perform compression for efficient storage in the shared cache 205.

Other API calls used in management of the configuration data within the shared cache 205 include a "Configurations GET" API that retrieves a configuration version from the shared cache 205 and returns it in a same structure used in the Configuration PUT API call, in one aspect enabling a process, user or service provider caller to check the current configuration version data settings, and un-compress the cached configuration version data where compressed by the Configuration PUT API call; a "Configurations DELETE" API removes a version of the component configuration from the shared cache 205; and a "Configurations GET" API that accesses values from a configuration version stored to the shared cached 205; and still other API will be apparent to one skilled in the art.

The shared cache 205 is external to local memory devices (RAM memory, etc.) of the configured processor and is a Redis, MongoDB or other database or data storage device, cloud service or other data repository. Redis is an open source, in-memory data structure store provided by Redis Labs that may be used as a database, cache and message broker, and that supports data structures including strings, hashes, lists, sets, sorted sets with range queries, bitmaps, hyperloglogs, geospatial indexes with radius queries and streams. MongoDB is a cross-platform document-oriented database program developed by MongoDB Inc. that is classified as a NoSQL ("not only SQL," wherein SQL stands for "Structured Query Language") database program and uses JSON-types of documents with schemata. JSON is an open-standard file format that uses human-readable text to transmit data objects consisting of attribute—value pairs and array data types.

In response to determining at 204 that one or more of the application components (for example, one or more containers or components of the application) needs or requests a specific configuration version of the application (for example, a "first" one of a plurality of different versions), at 206 the configured processor searches a local cache 203 portion of random access memory (RAM) that is allocated to the configured processor for executing the application for file data comprising the specific configuration version in a run-time format; and in response to finding the run-time file data cached in the local cache 203, reads the configuration version from local cache configuration version run-time file data, including the values of two, different timestamps: a "last-checked" timestamp and a "last-modified" timestamp.

At 210, in response to determining that said configuration version run-time format file data is cached in the local cache 203 and that a time elapsed since the last-checked timestamp (in effect, the time elapsed to a current time of checking the timestamp value) does not exceed an expiration time period, at 214 the configured processor returns the specific configuration version file data saved to the local cache 203.

The expiration time period is defined, or determined by the configured processor as a function of application component and/or system attributes, to provide a time period within which the specific configuration version is unlikely to be updated since last saved to the local cache 203. In one example, the configured processor sets or applies an expiration time period at 210 of five (5) minutes in response to determining that historical versioning of the specific configuration version for a requesting component, or of components of a similar type, are never, or rarely (less than a threshold frequency value of total run time) updated more often than every five minutes during run-time.

Embodiments thus improve efficiencies over conventional systems: if the configuration version has been checked within the appropriate expiration time period, then the process defaults at 210 to accepting that the current version is likely valid (unlikely to have been updated), providing cost and resource efficiencies over conventional HR systems by moving directly to executing the cached configuration version and avoiding the (probably or likely) needless expenditure of processing resources and processing time required to check for any updates to the locally cached configuration version, in view of historical data that indicates that it is unlikely that such an update has occurred since the version was last checked (or stored) in the local cache 203.

Some embodiments dynamically set, tune or update the expiration time period defined and applied at 210 as a function of current system attributes: for example, increasing the expiration time to reduce the frequency of checks for updates when resources are limited or more costly, and decreasing the expiration time period to perform more or more frequent checks for updates, in order to increase reliance on the version selected for execution (as discussed below) when resources are less limited or costly. Illustrative but not limiting or exhaustive examples of resources considered in setting the expiration time include current or projected network communication or memory bandwidth availability, current or projected processing costs, time of business day (peak business hours or late-night or low-demand time periods), and still other considerations will be apparent to one skilled in the art.

Otherwise, in response to determining at 210 that the specific configuration version is not cached in the local cache 203, or that it has expired relative to the expiration time period, at 216 the configured processor reads the external configuration structured format file representation of the specific needed/requested configuration version saved to the shared cache 205, including the last-modified timestamp value of the file saved to the shared cache.

At 218 the configured processor determines whether a configuration version file found stored in the local cache 203 has been updated since storage of the structured format file representation of the version within the shared cache 205 (whether the value of last-modified timestamp stored to the shared cache is more recent in time, or greater than, the value of last-modified timestamp stored to the local cache: if not ("No" condition), the configured processor proceeds to 220 to update the last-checked timestamp value for the specific configuration version file stored in the local cache 203 to a current time (for example, of the determination at 210), and return the version saved (updated) in the local cache 203 at 214. Thus, the embodiment has determined that as the version on the local cache is still the most recently modified version, there is no need to replace the locally cached version with the version on the shared cache.

Otherwise, in response to determining at 218 that either no configuration version file is found stored in the local cache 203 for the specific requested/needed configuration version (at 206), or that a version found stored in the shared cache 203 has been updated relative to storage of the structured format version file within the shared cache 203 (that the value of last-modified timestamp of the version file stored to the shared cache 205 is more recent in time, or greater than, the value of last-modified timestamp of the version stored to the local cache 203), at 222 the configured processor translates the structured format configuration version data read from the shared cache 205 version file (at 126) into a different "run-time" format or data structure that is used by the application (or components or containers thereof) at run-time, and stores the translated, run-time data as a configuration version file in the local cache 203 with the last-modified timestamp value stored in the shared cache 205 as the last-modified timestamp value of the version saved to the local cache 203.

More particularly, at 222 the configured processor translates the structured configuration version data stored in the shared cache 205 into another format that that enables a processor executing the application or containers thereof to quickly search or otherwise utilize the translated version data, thereby improving performance of the program relative to other processes that would rely on the structured data instead.

Thus, from 222 the configured processor moves on to 220 to update (or set) the last-checked timestamp value for the translated data to a current time (for example, the time of translation of the data at 222); and to return the configuration version file in the run-time data format saved to the local cache 203 at 214.

By using local and shared caching and dynamic, individual verification of container configuration externalizations, embodiments proportionately reduce the requirement for code deployment and reduce maintenance costs, including within lower-level test and pilot environments. More particularly, some embodiments at 204 further determine whether a specific version requested is a pilot version (for example, in response to determining that a consumer or user of the application is a pilot user), and then responsively select and pass an appropriate pilot configuration version from the cache structures 203 or 205, as distinguished from another, non-pilot version that is returned for other, non-pilot users/consumers. Some embodiments distinguish between pilot and non-pilot versions by determining the values of pilot version identifiers within cache keys used to store the versions in the cache structures 203 or 205. Thus, the embodiment enables selective piloting of updates, wherein only users having user identification indicia meeting pilot program requirements at 204 (unique identity, or generic to subsets of users within an organization, work group membership, having a common permission level, etc.) receive, or do not receive, pilot version updates, relative to other users outside of the pilot program membership criteria.

Pilot version selection at 204 may also be based on usage attributes: for example, updates from the shared cache may be restricted to frequent users, such as those meeting a frequent-user threshold value (within the last week, day, four hours, thirty minutes, etc.) This allows for an incoming request to a user profile system to have an additional parameter that identifies the configuration version that the process wants to use for a given (selected or unselected) user, wherein pilot clients get the one version configuration, via passing the pilot version out of the shared cache 205, whereas other users get another version from the shared cache 205, or continue to use their current, locally-cached version.

Embodiments of the present invention provide two different, independent means for efficiently allocating (limiting) resources expended on executing various containers or components of an application at run-time: limiting the expenditure of resources to check for more current versions to executions that have not been already checked at least an expiration time period from the current time; and then only expending resources to refresh the locally-cached versions in response to confirming that a more recent version exists (as represented by the version saved to the shared cache 205). As run-times are quicker and more efficient via use of local cache structures relative to external, shared cache resources, this provides direct efficiencies in proportion to the amount of shared cache read and transformation operations avoided that would otherwise be performed in conventional HR systems.

Multiple, different processes, systems and technologies may be used to translate the external configuration data at storage into, and from, the shared cache 205, providing additional opportunities to select and use a most efficient process for each container configuration file, inclusive of "node.js," an open-source, cross-platform JavaScript® run-time environment that executes JavaScript® code outside of a browser, wherein each of different component files stored in the shared cache 205 in JSON format can then be translated into a different format that works best for the process utilizing the configuration information.

The expiration time period structures described above enable embodiments to periodically determine whether updates must be made to the external configurations file locally cached, keeping the locally cached data current through autonomous processes. JSON or other structured data formats are easily and quickly parsed and searched to identify data for translation into formats optimized for use at run-time and storage in the local cached 203 structure, enabling efficient container configuration updates by the running system, thereby minimizing impact on systems executing the application.

An executing application might have many containers that need to be updated, and the containers might be using different technology stacks. External configuration JSON or other structured format files generated and stored into the shared cache 205 for each of the containers may contain large amounts of data, any of which may be updated or revised, some with more frequency than others. By dynamical changing configuration versions in response to specific needs of subsets of individual containers that are determined at run time (at 204, FIG. 1) to meet the requisite conditions described above (as to meeting the last-checked and last-modified timestamp value conditions described therein), embodiments achieve update across all of the containers, since they will generally (normally) update themselves replace older versions previously saved to their local caches 203 to new configuration versions read and translated from the shared cache 205 after a new configuration version is deployed to the shared cache 205, thereby effectively updating each of the containers without the down-time associated with an application deployment required in conventional systems. Further efficiencies are achieved by providing configuration version data saved to local cache 203 structures in formats optimized for execution at run-time.

Figure 2:
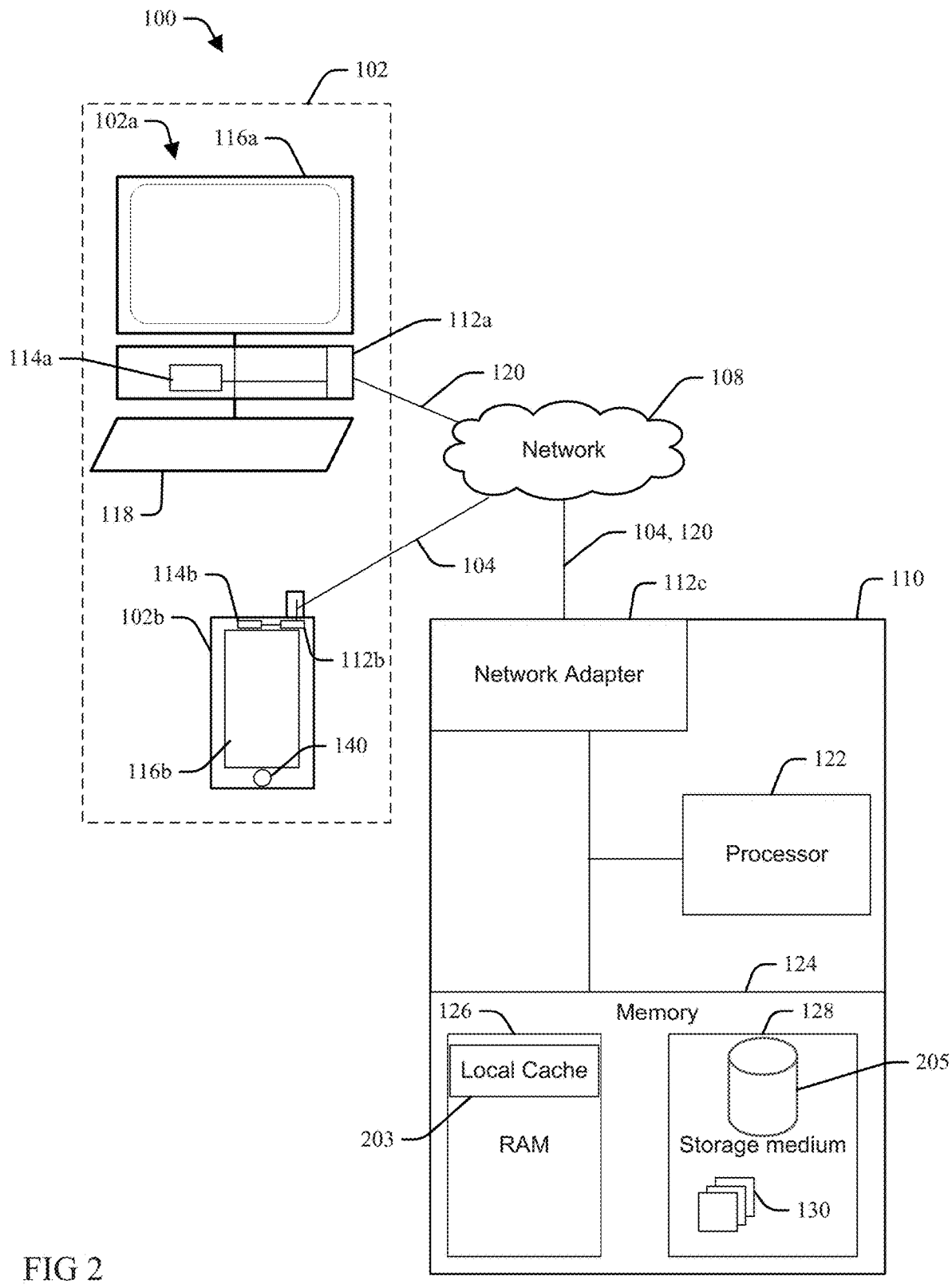
FIG. 2 is a graphic illustration of an example of another implementation according to an embodiment of the present invention.

FIG. 2 is a schematic, graphic illustration of an embodiment of a system 100 according to the present invention. The system 100 includes one or more local computing devices 102, such as, for example, a desktop computer 102a or smartphone 102b; other examples includes a laptop computer, personal digital assistant, tablet, cellular telephone, body worn device, or the like. Lines of the schematic illustrate communication paths between the devices 102a, 102b and a computer server 110 over a network 108, and between respective components within each device. Communication paths between the local computing devices 102a and 102b and the computer server 110 over the network 108 include respective network interface devices 112a, 112b, and 112c within each device, such as a network adapter, network interface card, wireless network adapter, and the like.

In the present example, the smartphone 102b transfers a request 104 by an organization member for a configuration version (such as input by the member through a GUI display device 116b) over a network 108 to a computer server 110 via their respective network interface adapters 112b and 112c. The computer server 110 includes a processor 122 configured (thus, the "configured processor" discussed above with respect to FIG. 1) with instructions stored in a memory 124. The processor 122 of the computer server 110 and the processors 114a and 114b of the local computing devices include, for example, a digital processor, an electrical processor, an optical processor, a microprocessor, a single core processor, a multi-core processor, distributed processors, parallel processors, clustered processors, combinations thereof and the like. The mobile device 102b may also include a microphone 140, which may receive verbal commands from a user. The memory 124 includes a computer readable random access memory (RAM) 126 and a computer readable storage medium 128.

As described above with respect to FIG. 1, the computer server 110, in response to executing an application in response to the request 104 returns (as a data output 120 over the network 108 to the local computing device 102a via their respective network interface adapters 112c and 112a) a configuration version cached within a local cache 203 region allocated within the RAM 126 in response to verifying that the version has not expired (validating that the last-checked timestamp data meets expiration time period conditions); or translates structured data from another version file stored in the shared cache 205 into a run-time format and stores the translated data into the local cache 203, returns the translated and stored data.

The local computing devices 102 include one or more input devices 118, such as a keyboard, mouse, microphone, touch screen, etc., and wherein the processor 114a drives display devices 116a to present data values as described above with respect to FIG. 1.

The computer readable storage medium 128 can be a tangible device that retains and stores instructions for use by an instruction execution device, such as the processor 122. The computer readable storage medium 128 may be, for example, but is not limited to, an electronic storage device, a magnetic storage device, an optical storage device, an electromagnetic storage device, a semiconductor storage device, or any suitable combination of the foregoing. A computer readable storage medium 128, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be transmitted to respective computing/processing devices from the computer readable storage medium 128 or to an external computer or external storage device via the network 108. The network 108 can include private networks, public networks, wired networks, wireless networks, data networks, cellular networks, local area networks, wide area networks, the Internet, and combinations thereof. The network interface devices 112a, 112b and 122c in each device exchange (receive and send) computer readable program instructions from and through the network 108 and, include storage in or retrieval from the computer readable storage medium 128.

Computer readable program instructions for carrying out operations of the present invention may include assembler instructions, instruction-set-architecture (ISA) instructions, machine instructions, machine dependent instructions, microcode, firmware instructions, state-setting data, configuration data for integrated circuitry, compiled or interpreted instructions, source code or object code written in any combination of one or more programming languages or programming environments, such as Java®, Javascript®, C, C#, C++, Python, Cython, F #, PHP, HTML, Ruby, and the like. (JAVA and JAVASCRIPT are trademarks of Oracle America, Inc., in the United States or other countries.)

The computer readable program instructions may execute entirely on the computer server 110, partly on the computer server 110, as a stand-alone software package, partly on the computer server 110 and partly on the local computing devices 102 or entirely on the local computing devices 102. For example, the local computing devices 102 can include a web browser that executes HTML instructions transmitted from the computer server 110, and the computer server executes JAVA instructions that construct the HTML instructions. In another example, the local computing devices 102 include a smartphone application, which includes computer readable program instructions to perform the processes described above.

The memory 124 can include a variety of computer system readable media. Such media may be any available media that is accessible by computer server 110, and the media includes volatile media, non-volatile media, removable, non-removable media, and combinations thereof. Examples of the volatile media can include random access memory (RAM) and/or cache memory. Examples of non-volatile memory include magnetic disk storage, optical storage, solid state storage, and the like. As will be further depicted and described below, the memory 124 can include at least one program product having a set (e.g., at least one) of program modules 130 that are configured to carry out the functions of embodiments of the invention.

The computer system 100 is operational with numerous other computing system environments or configurations. Examples of well-known computing systems, environments, and/or configurations that may be suitable for use with computer system 100 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine ("a configured processor"), such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In one aspect, a service provider may perform process steps of the invention on a subscription, advertising, and/or fee basis. That is, a service provider could offer to integrate computer-readable program code into the computer system 100 to enable the computer system 100 to perform the processes of FIG. 1 discussed above. The service provider can create, maintain, and support, etc., a computer infrastructure, such as components of the computer system 100, to perform the process steps of the invention for one or more customers. In return, the service provider can receive payment from the customer(s) under a subscription and/or fee agreement and/or the service provider can receive payment from the sale of advertising content to one or more third parties. Services may include one or more of: (1) installing program code on a computing device, such as the computer device 110, from a tangible computer-readable medium device 128; (2) adding one or more computing devices to the computer infrastructure 100; and (3) incorporating and/or modifying one or more existing systems 110 of the computer infrastructure 100 to enable the computer infrastructure 100 to perform process steps of the invention.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty and are not to be construed to limit the claims to any specific illustrated element or embodiment, or to imply any precedence, ordering or ranking of any claim elements, limitations or process steps.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   storing, into a shared cache, a first version of a structured data format file and a second version of the structured data format file, the first version and the second version each comprising different configuration version data for an application;
   setting an expiration time period to a first time period in response to determining that historical updating of versioning of the configuration version data occurs less than a threshold frequency value during the first time period;
   in response to a request from a user at run-time for the configuration version data for the application, determining whether run-time format data of the configuration version data is stored in a local cache, wherein the local cache is different from the shared cache, and wherein the run-time format is different from the structured data format and enables a processor to execute the configuration version data at run-time;

in response to determining that the run-time format data of the configuration version data is stored in the local cache, determining a last-checked timestamp value that is associated to the run-time format data stored in the local cache, determining a first last-modified timestamp value that is associated to the run-time format data stored in the local cache, and determining a second last-modified timestamp value that is associated to the structured data format file stored in the shared cache;

returning the data from the configuration version run-time format file stored within the local cache in satisfaction of the request at run-time for the configuration version data of the application in response to determining that a time elapsed from the last-checked timestamp value does not exceed the expiration time period and that the second last-modified timestamp value is not more recent than the first last-modified timestamp value; and in response to determining that the run-time format data of the configuration version data is not stored in the local cache, during execution of the application:

determining whether an attribute value of the user meets a threshold attribute value;

in response to determining that the attribute value of the user meets the threshold attribute value, reading data from the first version of the structured data format file stored in the shared cache;

in response to determining that the attribute value of the user does not meet the threshold attribute value, reading data from the second version of the structured data format file stored in the shared cache;

translating the read data from the structured data format into the run-time data format;

storing the translated data into the local cache in a run-time format file; and returning data from the configuration version run-time format file stored within the local cache in satisfaction of the request at run-time for the configuration version data of the application; and wherein the threshold attribute value is selected from the group consisting of a user identification indicia value and a frequency of access of the user to the shared cache.

2. The method of claim 1, further comprising:
in response to determining that the second last-modified timestamp value is more recent than the first last-modified timestamp value, performing the reading the data from the structured data format file stored in the shared cache, the translating the read data from the structured data format into the run-time data format, the storing the translated data into the local cache in the run-time format file and the returning the data from the configuration version run-time format file stored within the local cache in satisfaction of the request at run-time for the configuration version data of the application.

3. The method of claim 1, further comprising:
in response to determining that the time elapsed from the last-checked timestamp value exceeds the expiration time period, performing the reading the data from the structured data format file stored in the shared cache, the translating the read data from the structured data format into the run-time data format, the storing the translated data into the local cache in the run-time format file and the returning the data from the configuration version run-time format file stored within the local cache in satisfaction of the request at run-time for the configuration version data of the application.

4. The method of claim 3, further comprising:
executing a representational state transfer PUT application programming interface call that validates configuration data retrieved for the configuration version, formats the validated configuration data into the structured data format, compresses the formatted validated configuration data, and stores the compressed formatted validated configuration data into the shared cache as the structured data format file.

5. The method of claim 4, wherein the structured data format comprises at least one of JAVASCRIPT object notation code and extensible mark-up language code.

6. The method of claim 5, wherein the local cache is a portion of random access memory device that is allocated to a processor for the configuration version file data; and
wherein the shared cache is an external data repository that is different from the random access memory device and that supports data structures selected from the group consisting of strings, hashes, lists, sets, sorted sets with range queries, bitmaps, hyperloglogs, geospatial indexes with radius queries, streams, JAVASCRIPT object notation code, extensible mark-up language code, attribute-value pairs and array data types.

7. The method of claim 1, further comprising:
integrating computer-readable program code into a computer system comprising the processor, a computer readable memory in circuit communication with the processor, and a computer readable storage medium in circuit communication with the processor; and
wherein the processor executes program code instructions stored on the computer-readable storage medium via the computer readable memory and thereby performs the storing the first version of the structured data format file and the second version of the structured data format file into the shared cache, the setting the expiration time period, the determining whether the run-time format data of the configuration version data is stored in the local cache, the determining the last-checked timestamp value, the returning the data from the configuration version run-time format file stored within the local cache in satisfaction of the request at run-time for the configuration version data of the application in response to the determining that the time elapsed from the last-checked timestamp value does not exceed the expiration time period, the determining whether the attribute value of the user meets the threshold attribute value, the reading the data from the first version of the structured data format file stored in the shared cache, the reading the data from the second version of the structured data format file stored in the shared cache, the translating the read data from the structured data format into the run-time data format, the storing the translated data into the local cache in the run-time format file, and the returning the data from the configuration version run-time format file stored within the local cache in satisfaction of the request at run-time for the configuration version data of the application.

8. The method of claim 7, wherein the computer-readable program code is provided as a service in a cloud environment.

9. A system, comprising:
a processor;
a computer readable memory in circuit communication with the processor;

a computer readable storage medium in circuit communication with the processor; and wherein the processor executes program instructions stored on the computer-readable storage medium via the computer readable memory and thereby:

stores, into a shared cache, a first version of a structured data format file and a second version of the structured data format file, the first version and the second version each comprising different configuration version data for an application;

sets an expiration time period to a first time period in response to determining that historical updating of versioning of the configuration version data occurs less than a threshold frequency value during the first time period;

in response to a request from a user at run-time for the configuration version data for the application, determines whether run-time format data of the configuration version data is stored in a local cache, wherein the local cache is different from the shared cache, and wherein the run-time format is different from the structured data format and enables a processor to execute the configuration version data at run-time;

in response to determining that the run-time format data of the configuration version data is stored in the local cache, determines a last-checked timestamp value that is associated to the run-time format data stored in the local cache, determines a first last-modified timestamp value that is associated to the run-time format data stored in the local cache, and determines a second last-modified timestamp value that is associated to the structured data format file stored in the shared cache;

returns the data from the configuration version run-time format file stored within the local cache in satisfaction of the request at run-time for the configuration version data of the application in response to determining that a time elapsed from the last-checked timestamp value does not exceed the expiration time period and that the second last-modified timestamp value is not more recent than the first last-modified timestamp value; and in response to determining that the run-time format data of the configuration version data is not stored in the local cache, during execution of the application:

determines whether an attribute value of the user meets a threshold attribute value;

in response to determining that the attribute value of the user meets the threshold attribute value, reads data from the first version of the structured data format file stored in the shared cache;

in response to determining that the attribute value of the user does not meet the threshold attribute value, reads data from the second version of the structured data format file stored in the shared cache;

translates the read data from the structured data format into the run-time data format;

stores the translated data into the local cache in a run-time format file; and returns data from the configuration version run-time format file stored within the local cache in satisfaction of the request at run-time for the configuration version data of the application; and wherein the threshold attribute value is selected from the group consisting of a user identification indicia value and a frequency of access of the user to the shared cache.

10. The system of claim 9, wherein the processor executes the program instructions stored on the computer-readable storage medium via the computer readable memory and thereby:

in response to determining that the second last-modified timestamp value is more recent than the first last-modified timestamp value, reads the data from the structured data format file stored in the shared cache, translates the read data from the structured data format into the run-time data format, stores the translated data into the local cache in the run-time format file and returns the data from the configuration version run-time format file stored within the local cache in satisfaction of the request at run-time for the configuration version data of the application.

11. The system of claim 9, wherein the processor executes the program instructions stored on the computer-readable storage medium via the computer readable memory and thereby:

in response to determining that the time elapsed from the last-checked timestamp value exceeds the expiration time period, reads the data from the structured data format file stored in the shared cache, translates the read data from the structured data format into the run-time data format, stores the translated data into the local cache in the run-time format file and returns the data from the configuration version run-time format file stored within the local cache in satisfaction of the request at run-time for the configuration version data of the application.

12. The system of claim 11, wherein the processor executes the program instructions stored on the computer-readable storage medium via the computer readable memory and thereby:

executes a representational state transfer PUT application programming interface call that validates configuration data retrieved for the configuration version, formats the validated configuration data into the structured data format, compresses the formatted validated configuration data, and stores the compressed formatted validated configuration data into the shared cache as the structured data format file;

wherein the structured data format comprises at least one of JAVASCRIPT object notation code and extensible mark-up language code;

wherein the local cache is a portion of random access memory device that is allocated to a processor for the configuration version file data; and wherein the shared cache is an external data repository that is different from the random access memory device and that supports data structures selected from the group consisting of strings, hashes, lists, sets, sorted sets with range queries, bitmaps, hyperloglogs, geospatial indexes with radius queries, streams, JAVASCRIPT object notation code, extensible mark-up language code, attribute-value pairs and array data types.

13. A computer program product, comprising:

a computer readable storage medium having computer readable program code embodied therewith, wherein the computer readable storage medium is not a transitory signal per se, the computer readable program code comprising instructions for execution by a processor that cause the processor to:

store, into a shared cache, a first version of a structured data format file and a second version of the structured data format file, the first version and the second version each comprising different configuration version data for an application;

set an expiration time period to a first time period in response to determining that historical updating of versioning of the configuration version data occurs less than a threshold frequency value during the first time period;

in response to a request from a user at run-time for the configuration version data for the application, determine whether run-time format data of the configuration version data is stored in a local cache, wherein the local cache is different from the shared cache, and wherein the run-time format is different from the structured data format and enables a processor to execute the configuration version data at run-time;

in response to determining that the run-time format data of the configuration version data is stored in the local cache, determine a last-checked timestamp value that is associated to the run-time format data stored in the local cache, determine a first last-modified timestamp value that is associated to the run-time format data stored in the local cache, and determine a second last-modified timestamp value that is associated to the structured data format file stored in the shared cache;

return the data from the configuration version run-time format file stored within the local cache in satisfaction of the request at run-time for the configuration version data of the application in response to determining that a time elapsed from the last-checked timestamp value does not exceed the expiration time period and that the second last-modified timestamp value is not more recent than the first last-modified timestamp value; and in response to determining that the run-time format data of the configuration version data is not stored in the local cache, during execution of the application:

determine whether an attribute value of the user meets a threshold attribute value;

in response to determining that the attribute value of the user meets the threshold attribute value, read data from the first version of the structured data format file stored in the shared cache;

in response to determining that the attribute value of the user does not meet the threshold attribute value, read data from the second version of the structured data format file stored in the shared cache;

translate the read data from the structured data format into the run-time data format;

store the translated data into the local cache in a run-time format file; and return data from the configuration version run-time format file stored within the local cache in satisfaction of the request at run-time for the configuration version data of the application; and wherein the threshold attribute value is selected from the group consisting of a user identification indicia value and a frequency of access of the user to the shared cache.

14. The computer program product of claim 13, wherein the computer readable program code instructions for execution by the processor further cause the processor to:

in response to determining that the time elapsed from the last-checked timestamp value exceeds the expiration time period, read the data from the structured data format file stored in the shared cache, translate the read data from the structured data format into the run-time data format, store the translated data into the local cache in the run-time format file and return the data from the configuration version run-time format file stored within the local cache in satisfaction of the request at run-time for the configuration version data of the application.

15. The computer program product of claim 14, wherein the computer readable program code instructions for execution by the processor further cause the processor to:

execute a representational state transfer PUT application programming interface call that validates configuration data retrieved for the configuration version, formats the validated configuration data into the structured data format, compresses the formatted validated configuration data, and stores the compressed formatted validated configuration data into the shared cache as the structured data format file;

wherein the structured data format comprises at least one of JAVASCRIPT object notation code and extensible mark-up language code;

wherein the local cache is a portion of random access memory device that is allocated to a processor for the configuration version file data; and wherein the shared cache is an external data repository that is different from the random access memory device and that supports data structures selected from the group consisting of strings, hashes, lists, sets, sorted sets with range queries, bitmaps, hyperloglogs, geospatial indexes with radius queries, streams, JAVASCRIPT object notation code, extensible mark-up language code, attribute-value pairs and array data types.

* * * * *